United States Patent Office 2,817,750
Patented Dec. 24, 1957

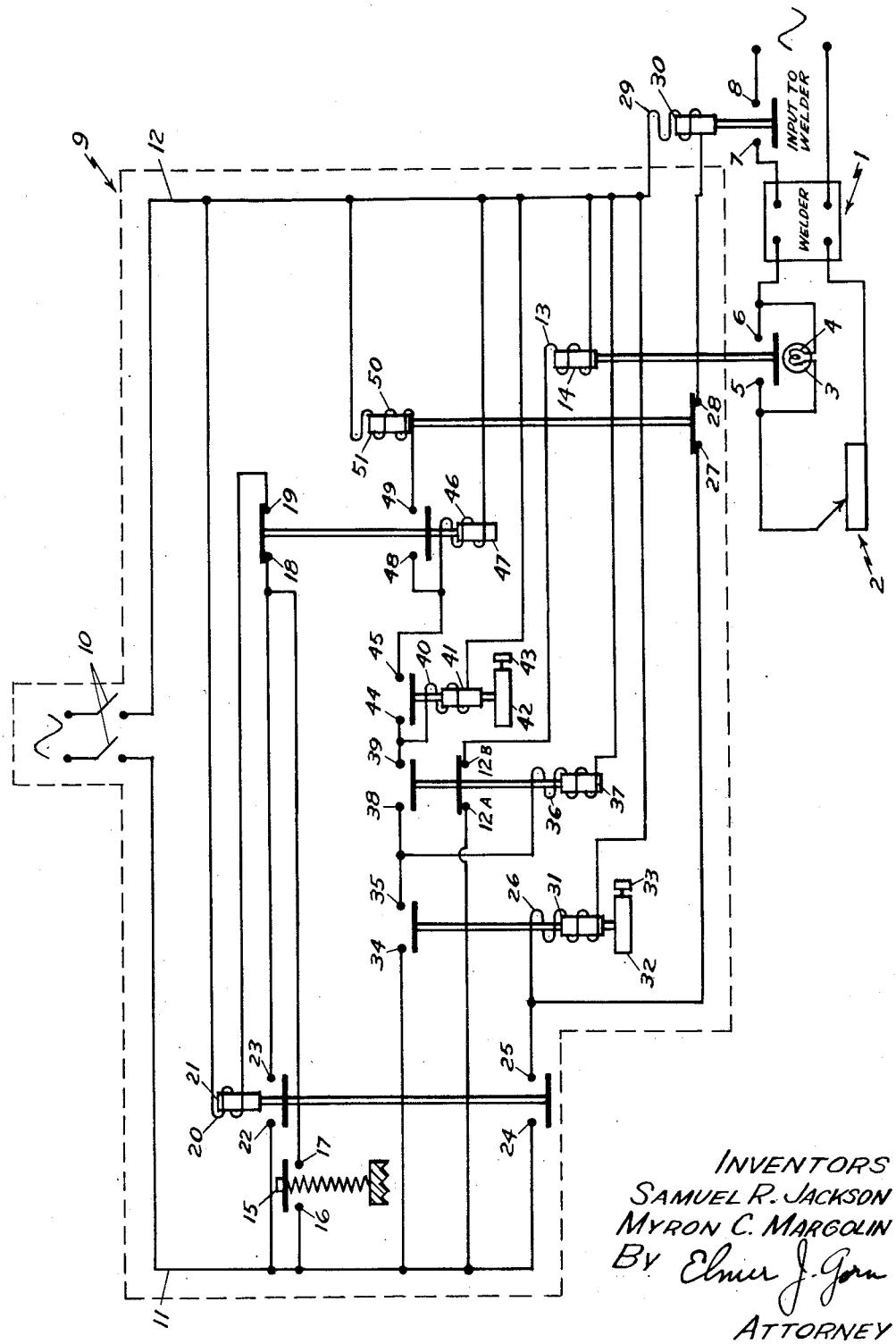

2,817,750

CRATER ELIMINATORS

Samuel R. Jackson, Waltham, and Myron C. Margolin, Brookline, Mass., assignors to Raytheon Manufacturing Company, Waltham, Mass., a corporation of Delaware Application February 23, 1955, Serial No. 489,921

4 Claims. (Cl. 219—131)

This invention relates to a crater eliminator, and in particular to a crater eliminator for an electric arc welding machine.

In an electric arc welding process, a crater generally occurs when full welding current is suddenly interrupted. The molten metal cools from the outside towards the inside, leaving a pinhole at its center, or, possibly, leaving radial cracks running across the weld. On seam welding, this type of termination leaves a small crater which results in a weld that is structurally weak and also unsightly. In vacuum tube welding, which is usually circular, this type of weld termination is unsatisfactory since the seam is expected to be vacuum tight.

It has been determined that the crater can be eliminated if the welding current is reduced gradually before it is interrupted. On a cylindrical weld, the termination is allowed to overlap the beginning of the weld, after which the welding current is decreased to approximately one-third of the original value. It is then possible to interrupt the welding current without forming an objectionable crater. Heretofore, variable resistors have been inserted in the welding circuit, operated either manually or by automatic means, for the purpose of reducing the welding current. In modern high-speed welding, it has been found that the split-second timing required to reduce the formation of craters is not sufficient to enable the operator to turn a control or operate a switch.

A crater eliminator, constructed in accordance with the principles of this invention, comprises a resistive element having a positive coefficient of resistance with respect to temperature, an arc welding machine connected by suitable means to a load, and means for inserting said resistive element in the welding circuit of said arc welding machine at a time before the welding current is removed. The resistive element can be inserted in the welding circuit, either automatically by a timer or manually by an operator. The reduction of the welding current is accomplished automatically when the resistive element is inserted in the welding circuit due to the positive coefficient of resistance with respect to temperature of said resistive element.

Further objects and advantages of this invention will be apparent as the description progresses, reference now being made to the accompanying drawing which illustrates in schematic form an embodiment of this invention.

In the accompanying drawing there is shown a welder 1, the output of which is connected in series with a load 2, and a parallel combination consisting of an incandescent bulb 3, having a tungsten filament 4, and normally opened contactor points 5 and 6. An incandescent bulb 3, having a tungsten filament 4, has been chosen as the resistice element, since tungsten has the desired positive coefficient of resistance with respect to temperature. The input to welder 1 is controlled by normally opened contactor points 7 and 8, located in series with the power input to said welder 1. In the preferred embodiment, a controller 9 is used to automatically preset the length of time for the welding operation and, at the end of the welding operation, to insert the incandescent bulb 3 in the welding circuit until the welding current has been reduced to approximately one-third of its former value, at which time the power to welder 1 is removed.

Power is supplied to controller 9 by a suitable source through a main line power switch 10. Closing switch 10 energizes line 11 and line 12 which are opposite lines of the incoming circuit. As soon as switch 10 is closed, a circuit appears from line 11 through the series combination of the normally closed contactor points 12A and 12B and through coil 13 to line 12, resulting in coil 13 being energized. The energized coil 13 will immediately attract core 14 which will close the normally opened contactor points 5 and 6. This action is necessary to preset the output of the welder for the initial welding operation. It will be noted that the welding operation cannot begin until the normally opened contactor points 7 and 8 are closed.

In order to start the welding operation, the operator must depress switch 15, which in the preferred embodiment is a normally opened foot-operated switch located in close proximity to the operator. Depressing switch 15 causes a series circuit to appear from line 11 through the switch contact points 16 and 17 through the normally closed contactor points 18 and 19 and then through coil 20 to line 12, resulting in the energizing of coil 20. The energized coil 20 immediately attracts core 21 which will result in the closing of normally opened contactor points 22 and 23 and 24 and 25. The closing of contactor points 22 and 23 establishes a hold circuit for coil 20 from line 11 through contactor points 22 and 23 to a junction point with contactor point 17 and through normally closed contactor points 18 and 19 and thence through coil 20 to line 12. The closing of contactor points 24 and 25 establishes a circuit from line 11 through contactor points 24 and 25 to a junction with coil 26, the other side of which is connected to line 12, and a series circuit consisting of normally closed contactor points 27 and 28 and coil 29, the other side of which is connected to line 12. This action results in the immediate energizing of coil 26 and coil 29. The energized coil 29 will attract core 30 which will be immediately attracted and close the normally opened contactor points 7 and 8. This action will begin the welding operation. As previously mentioned, coil 26 is also energized by the closing of contactor points 24 and 25, but core 31 has a delaying device 32 constructed preferably in the form of a dashpot having a time adjustment control 33. It is this time adjustment 33 that is preset by the operator in order to control the time necessary to complete the welding operation. After this preset time has elapsed, core 31 will be free to move, thereby closing contactor points 34 and 35. Upon the closing of contactor points 34 and 35, a series circuit exists from line 11 through contactor points 34 and 35 and through coil 36 to line 12 which results in the energizing of coil 36. The energized coil 36 will immediately attract core 37 which will open the normally closed contactor points 12A and 12B and also close the normally opened contactor points 38 and 39. The opened contactor points 12A and 12B will open the series circuit to coil 13, thereby allowing core 14 to be released and thereby permitting the closed contactor points 5 and 6 to be opened. This action will immediately place the tungsten filament 4 in series with the output of the welding circuit and the load 2. It will be apparent that, since the filament 4 is always in the circuit, there will be no arcing or abnormal current change at the instant of opening contactor points 5 and 6. At the same time that contactor points 12A and 12B open, contactor points 38 and 39 have closed, thereby presenting a circuit from line 11 through the now closed contactor points 34 and 35, through the now closed contactor points 38 and 39, and through coil 40, the other side of which is connected to line 12, resulting in the energization of coil 40. The energized coil 40 will attempt to attract core 41 except that connected to core 41 is a delay device constructed preferably in the form of a dashpot 42 having a time adjustment control 43. It is this time adjustment control 43 that is preset by the operator to control the length of time that filament 4 will be placed in the circuit before the welding current will be removed. It has been determined that it is not necessary to wait until the current decays to a minimum, but that it is only necessary to wait for a time, after which the welding current has reduced approximately one-third of its original value. The time delay is only approximate since different times are needed for different materials to be welded, but, as a general rule, a time sufficient to allow the welding current to reduce to approximately one-third of its value will prevent craters from forming. In actual practice, this time rarely exceeds eight seconds, after which the welding current can be removed without forming any craters. After this delay time has passed, core 41 will close, thereby closing normally opened contactor points 44 and 45, which in turn will present a series circuit from line 11 through the closed contactor points 34 and 35, through the closed contactor points 38 and 39, through the closed contactor points 44 and 45, to and through coil 46 which is connected to the line 12, resulting in the energization of coil 46. The energized coil 46 will immediately attract core 47, thereby closing the normally opened contactor points 48 and 49 and opening the normally closed contactor points 18 and 19 Since contactor point 48 is connected intermediate contactor point 45 and coil 46, a circuit will be presented from contactor point 45 to coil 50 which is connected to line 12, resulting in the energization of coil 50. The energized coil 50 will immediately attract core 51, which in turn will open the normally closed contactor points 27 and 28 which will de-energize coil 29, thereby opening its contactor points 7 and 8 located in the input circuit to welder 1. This action effectively stops all welding current. The opening of contactor points 18 and 19 open the hold circuit on coil 20, which now drops out, allowing contactor points 22 and 23 and contactor points 24 and 25 to return to their normally opened positions. The opening of contactor points 24 and 25 has the effect of dropping out of coil 26, which in turn drops out coil 36, which in turn drops out coil 40, which in turn drops out coil 46, which in turn drops out coil 50. Dropping out of coil 36 closes contactor points 12A and 12B which, as was originally stated, energize coil 13, which in turn will close contactor points 5 and 6, thereby presetting the welding circuit for its next operation automatically. It is now only necessary for the operator to depress normally-opened switch 15 to start another welding operation.

This completes the description of the embodiment of the invention illustrated herein. However, many modifications and advantages thereof will be apparent to persons skilled in the art without departing from the spirit and scope of this invention. For example, it is not necessary that the welding sequence be automatic, nor is it necessary that a preset time sequence be used. It is also within the scope of this invention to include placing the resistive element in the primary circuit of the welder, since it is recognized that some welders are more easily adaptable for controlling the output current from the primary. In actual practice, it has been determined that the actual time between completion of the welding operation and the removal of welding power very rarely exceeds eight seconds. Accordingly, it is desired that this invention not be limited to the particular details of the embodiment disclosed herein except as defined in the appended claims.

What is claimed is:

1. A system for eliminating welding craters comprising an evacuated bulb containing a variable resistive element having a positive coefficient of resistance with respect to temperature, said resistive element varying in resistance in response to the welding current passing therethrough, an arc welding machine connected by suitable means to a load, and means for inserting said resistive element in the welding circuit of said arc welding machine at a time before the welding current is removed.

2. A system for eliminating welding craters comprising an evacuated bulb containing a tungsten filament, an arc welding machine connected by suitable means to a load, and means for inserting said filament of said evacuated bulb in the welding circuit of said arc welding machine after the welding operation is completed but before the welding current is removed, said tungsten filament varying in resistance in response to the welding current passing therethrough.

3. A system for eliminating welding craters comprising an evacuated bulb containing a resistive element having a positive coefficient of resistance with respect to temperature, said resistive element varying in resistance in response to the welding current passing therethrough, an arc welding machine connected by suitable means to a load, means for inserting said resistive element in the welding circuit of said arc welding machine before the welding current is removed and means for removing the welding current at a time after said resistive element has been inserted in the welding circuit.

4. A system for eliminating welding craters comprising an evacuated bulb containing a tungsten filament, an arc welding machine connected by suitable means to a load, and means for inserting said tungsten filament in said evacuated bulb in series with said arc welding machine and said load before the welding current is removed, said tungsten filament varying in resistance in response to the welding current passing therethrough.

References Cited in the file of this patent

UNITED STATES PATENTS

| Number | Name | Date |
| --- | --- | --- |
| 1,326,743 | Kenyon | Dec. 30, 1919 |
| 2,123,063 | Peters | July 5, 1938 |
| 2,152,785 | Blankenbuehler | Apr. 4, 1939 |
| 2,239,577 | Serekx | Apr. 22, 1941 |
| 2,289,979 | Mann | July 14, 1942 |
| 2,351,083 | Tyrner | June 13, 1944 |
| 2,433,678 | Tyrner | Dec. 30, 1947 |